(12) United States Patent
Bitterolf et al.

(10) Patent No.: US 12,122,051 B2
(45) Date of Patent: Oct. 22, 2024

(54) METHOD AND DEVICE FOR GUIDING THE MOVEMENT OF A MOVABLE MACHINE ELEMENT OF A MACHINE

(71) Applicant: Siemens Aktiengesellschaft, Munich (DE)

(72) Inventors: David Bitterolf, Erlangen (DE); Hartmut Linke, Erlangen (DE); Fabian Erik Lorz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 303 days.

(21) Appl. No.: 17/411,856

(22) Filed: Aug. 25, 2021

(65) Prior Publication Data
US 2022/0063094 A1 Mar. 3, 2022

(30) Foreign Application Priority Data
Aug. 26, 2020 (EP) .................................. 20192831

(51) Int. Cl.
*H02P 6/08* (2016.01)
*B25J 9/16* (2006.01)
*G05B 19/416* (2006.01)

(52) U.S. Cl.
CPC ........... *B25J 9/1664* (2013.01); *B25J 9/1605* (2013.01); *B25J 9/1607* (2013.01); *G05B 19/416* (2013.01); *H02P 6/08* (2013.01)

(58) Field of Classification Search
CPC .............................. G02G 19/416; H02P 6/08
See application file for complete search history.

(56) References Cited

U.S. PATENT DOCUMENTS

| | | | |
|---|---|---|---|
| 4,860,215 A * | 8/1989 | Seraji | B25J 9/1633 901/45 |
| 6,114,825 A * | 9/2000 | Katz | G05B 19/416 318/609 |
| 6,975,086 B1 * | 12/2005 | Honda | G05B 5/01 318/560 |
| 7,902,785 B2 * | 3/2011 | Denk | G05B 19/19 318/560 |
| 2008/0216164 A1 | 9/2008 | Baffes et al. | |
| 2008/0218116 A1 * | 9/2008 | Maeda | G05B 19/19 318/632 |

(Continued)

FOREIGN PATENT DOCUMENTS

| | | |
|---|---|---|
| CN | 108027600 A | 5/2018 |
| CN | 108431704 A | 8/2018 |

(Continued)

*Primary Examiner* — Rina I Duda
(74) *Attorney, Agent, or Firm* — Henry M. Feiereisen LLC

(57) ABSTRACT

The movement of a machine element of a machine that can be driven via a shaft with the aid of a motor can be guided by specifying a setpoint guidance variable describing a desired movement process of the machine element for the actuation of the motor and determining an actual pilot variable and/or an actual guidance variable from the setpoint guidance variable by subjecting the setpoint guidance variable to a digital path model which simulates the dynamic behavior of the machine element and the motor. The digital path model is parameterized by the total moment of inertia and the poles and zeros of the transfer function of the mechanical system consisting of motor, shaft and machine element.

9 Claims, 2 Drawing Sheets

(56) References Cited

U.S. PATENT DOCUMENTS

| | | | |
|---|---|---|---|
| 2009/0160389 A1* | 6/2009 | Denk | G05B 19/19 |
| | | | 318/573 |
| 2009/0284208 A1 | 11/2009 | Ikeda et al. | |
| 2013/0173026 A1 | 7/2013 | Kawana et al. | |
| 2015/0365647 A1 | 12/2015 | Bitterolf et al. | |
| 2018/0269933 A1 | 9/2018 | Künzel et al. | |
| 2019/0018390 A1 | 1/2019 | Bitterolf et al. | |

FOREIGN PATENT DOCUMENTS

| | | |
|---|---|---|
| DE | 102005036848 A1 | 2/2007 |
| DE | 102005048390 A1 | 4/2007 |
| DE | 112006001583 T5 | 4/2008 |
| DE | 102009003919 A1 | 7/2010 |
| EP | 2634657 A1 | 9/2013 |
| EP | 2690513 A1 | 1/2014 |
| EP | 2954986 A1 | 12/2015 |

\* cited by examiner

METHOD AND DEVICE FOR GUIDING THE MOVEMENT OF A MOVABLE MACHINE ELEMENT OF A MACHINE

CROSS-REFERENCES TO RELATED APPLICATIONS

This application claims the priority of European Patent Application, Serial No. 20192831.4, filed Aug. 26, 2020, pursuant to 35 U.S.C. 119(a)-(d), the disclosure of which is incorporated herein by reference in its entirety as if fully set forth herein.

BACKGROUND OF THE INVENTION

The present invention relates to a method and a device for guiding the movement of a movable machine element of a machine.

The following discussion of related art is provided to assist the reader in understanding the advantages of the invention, and is not to be construed as an admission that this related art is prior art to this invention.

In order to guide the movement of a movable machine element of a machine, such as, for example, a machine tool, production machine and/or robot, the generation of setpoint guidance variables, such as, for example, setpoint position, setpoint velocity and/or setpoint acceleration as setpoint regulating variables for the regulating units connected to the control unit for regulating the motors of the machine that provide the drive for the traversing movement of the machine element is one of the central tasks of the control unit. Herein, as a rule, each machine has a plurality of machine shafts, wherein each machine shaft can generally move the movable machine element in the direction of the machine shaft with the aid of a motor assigned thereto and further components, such as, for example, a gear unit, wherein the machine element can, for example, be present in the form of a tool slide with a clamped workpiece and/or for example in the form of a toot Herein, the motor, the further components and the machine element constitute elements involved in the movement.

When calculating the setpoint guidance variables for the individual machine shafts of a machine, modern control units usually take account of the performance of the machine shafts in question in such a way that the guidance variables are generated in such a way that the permissible limit values are not exceeded during the movement of the movable machine element. In order, in addition, to avoid the excitation of critical natural frequencies of the elements involved in the movement, various commercially available measures are performed, but these are associated with sometimes considerable losses in the dynamics of the movement process of the movable machine element. One of these measures is, for example, so-called jerk limitation. The change in acceleration, i.e., the jerk, is specified according to specific profiles or held within defined bounds. In particular in the case of machine tools, the path velocity of the movement to be performed is reduced until the jerk limitations of the individual machine shafts are complied with and the path jerk defined on the path is not exceeded. Hence, targeted adaptation to the vibration behavior is only possible to a very limited extent, in particular with machine tool applications. For adequate production accuracy, the jerk has to be greatly reduced and so the dynamics are significantly limited and this results in higher production costs.

Another approach involves the use of so-called cam disks. In many applications, in particular in the case of production machines, the individual values of the setpoint guidance variables are generated using cam disks. Herein, the cam profiles are composed of polynomials. Herein, low vibration excitation is, for example, to be achieved by means of heuristic determination (cam disks as "soft" as possible, use of high-order polynomials). Adaptation to the mechanical vibration response of the elements involved in the movement can be associated with a corresponding slowing down of the process which likewise entails the above-named disadvantages.

Still another approach to reduce vibration load involves the use of so-called linear setpoint variable guidance filters. Herein, the spectral components in the range of critical frequencies are reduced by means of linear filters. However, such filtering is always associated with a signal delay. In particular in the case of machine tools, this leads to inaccuracies in production.

It would therefore be desirable and advantageous to obviate other prior art shortcomings.

SUMMARY OF THE INVENTION

According to one aspect of the present invention, a method for guiding the movement of a machine element of a machine that can be driven via a shaft with the aid of a motor includes specifying a setpoint guidance variable describing a desired movement process of the machine element for the actuation of the motor and determining an actual pilot variable and/or an actual guidance variable from the setpoint guidance variable by subjecting the setpoint guidance variable to a digital path model which simulates the dynamic behavior of the machine element and the motor.

A method according to the invention thus parametrizes the digital path model by the total moment of inertia and the poles and zeros of the transfer function of the mechanical system which includes motor, shaft and machine element.

According to another aspect of the present invention, a machine, such as, for example, a machine tool, production machine or robot, includes a motor, at least one movable machine element which is coupled to the motor via a shaft and the movement of which can be controlled by the motor, and a numerical machine control device. The machine control device is, on the one hand, configured to output a setpoint guidance variable describing a desired movement process of the machine element for the actuation of the motor. On the other hand, the machine control device is configured to determine an actual pilot variable and/or an actual guidance variable from the setpoint guidance variable by subjecting the setpoint guidance variable to a digital path model. The digital path model simulates the dynamic behavior of the machine element and the motor and is parameterized by the total moment of inertia and the poles and zeros of the transfer function of the mechanical system comprised of motor, shaft and machine element.

Substantial advantages of the procedure according to the invention can be explained as follows:

On the one hand, modeling of the dynamic behavior of a real overall shaft of a motor and a coupled machine element is associated with a high degree of abstraction. The creation of the model requires expertise and experience in modeling because the effects of the various physical parameters involved, such as torsional stiffness, degree of damping and mass inertia on the regulation behavior cannot always be grasped intuitively. Parameterization via poles, zeros and the total moment of inertia enables the controllable canonical form or also the observable canonical form to be achieved much more easily in a way that is much clearer to the user.

On the other hand, initial values for the modeling parameters can be automated and are easier to determine from measured values of the overall system without having to resort to initial values of physical parameters that are difficult to determine. In the case of parameterization via poles, zeros and the total moment of inertia, the model parameters can be adapted to the measured frequency response much more easily and quickly.

Last but not least, with parameterization via poles, zeros and the total moment of inertia, the controllable canonical form is free of matrices to be inverted so that numerical stability is provided at every point in time of the regulation.

According to another advantageous feature of the invention, the total moment of inertia and/or the poles and zeros of the transfer function can be ascertained from a frequency characteristic of the dynamic behavior of the machine element and the motor.

According to another advantageous feature of the invention, the method can be performed in real time during the movement process of the machine element.

According to another advantageous feature of the invention, a state-space representation of the digital path model can be ascertained from the total moment of inertia of the shaft and the poles and zeros of the transfer function of the mechanical system comprised of motor, shaft and machine element, preferably in controllable or observable canonical form. Herein, in some embodiments, the digital path model can be a regulating path of a linearly regulated digital model.

According to another advantageous feature of the invention, it may be possible to subtract an output variable of the digital path model, transformed via a feedback variable, from the setpoint guidance variable at an input summator of the digital model in order to form the actual pilot variable. Furthermore, in such cases, in some advantageous embodiments, it may be possible to multiply the output variable of the digital path model by a fitting vector in order to form the actual guidance variable.

According to another advantageous feature of the invention, the setpoint guidance variable can be a setpoint position, a setpoint velocity or a setpoint acceleration of the machine element.

According to another advantageous feature of the invention, the actual pilot variable and/or actual guidance variable determined can be fed into a closed loop for regulating the motor of the machine. Herein, it can be advantageous for the actual guidance variable to be delayed in time before being fed into the closed loop for regulating a motor of the machine.

According to another advantageous feature of the invention, the closed loop can have a position regulator to which the difference between the actual guidance variable and a measured actual variable is supplied for regulating the motor. In some variants, the closed loop can have a velocity regulator the output signal of which is added to the actual pilot variable in order to control the level of the motor current.

According to another advantageous feature of the invention, the method can be used to guide the movement of a machine element of a machine tool, production machine or robot.

According to another aspect of the invention, a computer program product for the numerical control of a machine can be provided which has computer-executable instructions, which, when they are executed in a numerical machine control device, implement a method according to the invention for guiding the movement of a machine element of the machine.

The above embodiments and variants can be combined with one another as desired where this makes sense. Further possible embodiments, developments and implementations of the invention also comprise combinations, not explicitly named, of features of the invention described above or below with respect to the exemplary embodiments, embodiments and/or variants. In, particular herein the person skilled in the art will also add individual aspects as improvements or additions to the respective basic form of the present invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
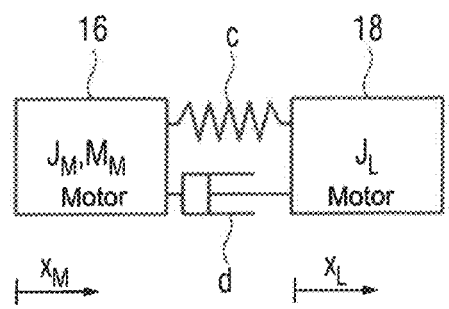
FIG. 1 is a schematic representation of a two-mass vibrational system.

Throughout all the figures, same or corresponding elements may generally be indicated by same reference numerals. These depicted embodiments are to be understood as illustrative of the invention and not as limiting in any way, it should also be understood that the figures are not necessarily to scale and that the embodiments, may be illustrated by graphic symbols, phantom lines, diagrammatic representations and fragmentary views, in certain instances, details which are not necessary for an understanding of the present invention or which render other details difficult to perceive may have been omitted.

Turning now to the drawing, and in particular to FIG. 1, there is shown a schematic representation of a two-mass vibrational system which includes a motor 16, which is connected or coupled to a load 18 via a shaft. The load 18 can, for example, be a machine element of a machine which can be driven by the motor. The motor 16 has a motor inertia $J_M$ and a motor torque $M_M$. The load 18 or the machine element 18 has a load inertia $J_L$. The connection along the shaft between the motor 16 and the load 18 has a stiffness c and a damping d. The connection can, for example, be present in the form of a gear unit, a drive shaft or a drive train.

If the rotor position angle $x_M$ of the rotor of the motor 16 changes, because of the finite torsional stiffness, in particular in dynamic cases, the load position $x_L$ does not change as would have been expected from a pure change in the rotor position angle $x_M$, rather the load position $x_L$ vibrates with respect to the position actually to be expected in static cases in dependence on the rotor position angle $x_M$.

The system dynamics of the two-mass vibrational system depicted in FIG. 1 can be described mathematically by a linear system of differential equations with the aid of customary transformation methods, such as Lagrange-methods, Newton-Euler methods and the like.

$$M \cdot \ddot{X} + D \cdot \dot{X} + K \cdot X = T \cdot f_M, \quad (1)$$

wherein M is the mass matrix, D is the damping matrix, K is the torsion stiffness matrix, T is a transformation matrix, X is the state vector and $f_M$ is the input control vector of the motor 16. Together with the holonomic equation $$u_{Mot} = T^T \cdot X \quad (2)$$

with the output variable vector $u_{Mot}$, which can, for example, be the rotor position angle $x_M$. Since the two-mass vibrational system is causal or implementable and the number m of zeros of the transfer function is lower than the number n of poles of the transfer function, after transition to the state-space representation by decomposing the nth order system differential equation into n first order differential equations, the state-space model with the following state equation results $$\dot{X} = [1 \ 0] X [0] f_{Mot} \quad (3)$$

and the output equation $$u_{Mot} = [\ ] X \quad (4)$$

To transfer a path model into a digital path model, it is necessary to discretize the state-space model of the equations (3) and (4). However, this discretization is very computationally intensive, since inversions of matrices are necessary in the state-space regulation. However, this kind of parameterization of the state matrix can result in numerical problems as the system order increases. In some circumstances, this results in unwanted instabilities due to rounding or overflow errors which can thus lead to uncontrolled movements of the machine shaft.

Therefore, it is provided according to the invention that the path model is transferred into the digital path model by parameterization via the total moment of inertia and the poles and zeros of the transfer function $H_{Mot} = u_{Mot}/f_{Mot}$ of the mechanical system comprised of motor 16, shaft and machine element 18. Herein, the machine shaft of the machine is formed by the motor 16, the load 18 and the connection between the motor 16 and the load 18 with a stiffness c and a damping d. This machine shaft has a total moment of inertia $J_G$.

With this parameterization, the discrete-time transfer function can be written directly from the parameters, i.e., the i=1 ... m conjugate-complex zero pairs $z_i$, the j=1 ... n (>m) conjugate-complex pole pairs $p_j$ and the total moment of inertia $J_G$ of the machine shaft:

$$H_{Mot} = \frac{\prod_{i=1}^{m}(z - z_i)(z - \bar{z}_i)}{\left(J_G(z-1)^2 \prod_{j=1}^{n}(z - p_j)(z - \bar{p}_j)\right)}$$

The transfer function (5) can be used to calculate the coefficients of the transfer function $a_i$ and $b_i$ which can be used to derive the transfer function directly into the state-space model. Either the controllable canonical form or the observable canonical form can be used for this purpose. As an example, the general controllable canonical form is shown below with the state differential equation:

$$\dot{X} = \begin{pmatrix} 0 & 1 & \cdots & 0 & 0 \\ 0 & 0 & \cdots & 0 & 0 \\ 0 & \vdots & \ddots & \vdots & \vdots \\ 0 & 0 & \cdots & 0 & 1 \\ -b_0 & -b_1 & \cdots & -b_{N-2} & -b_{N-1} \end{pmatrix} X + \begin{pmatrix} 0 \\ 0 \\ \vdots \\ 0 \\ 1 \end{pmatrix} f_{Mot} \quad (6)$$

and the algebraic output equation $$u_{Mot} = (a_0 - a_N b_0 \ a_1 - a_N b_1 \ \ldots \ a_{N-2} - a_N b_{N-2} \ a_{N-1} - a_N b_{N-1}) X + a_N f_{Mot} \quad (7)$$

The advantage with this controllable canonical form is that no matrices need to be inverted and numerical stability is always ensured. In addition, the parameters of the parameterization can be converted directly into the discrete-time coefficients of the state differential equation (6) and the output equation (7).

The new parameterization simplifies digital path modeling because every feature of the transfer function $H_{Mot} = u_{Mot}/f_{Mot}$ is uniquely parameterized. Accordingly, no expert knowledge regarding the effects of the mass matrix, the damping matrix or the torsion stiffness matrix is absolutely necessary for modeling or adjusting the modeling when there is a change to physical properties of the shaft, the motor 16 and/or the machine element 18, for example when a more rigid or more inert machine element 18 is installed. Moreover, the complexity of the state-space model (6)(7) does not increase with the system order because, no matter how many frequencies the model includes, the system matrix of the state differential equation (6) always only needs to be filled element-by-element.

The new type of parameterization using the total moment of inertia and the poles and zeros of the transfer function $H_{Mot} = u_{Mot}/f_{Mot}$ makes it possible to automatically identify the poles and zeros with the aid of a measured frequency response and to ascertain the total inertia. This automation of the main feature identification also enables the digital path modeling to be automated. Herein, for example, iterative optimization of the model parameters can be performed by adapting the modeled frequency response to the measured frequency response, for example by minimizing the least square deviation across the frequencies.

Figure 2:
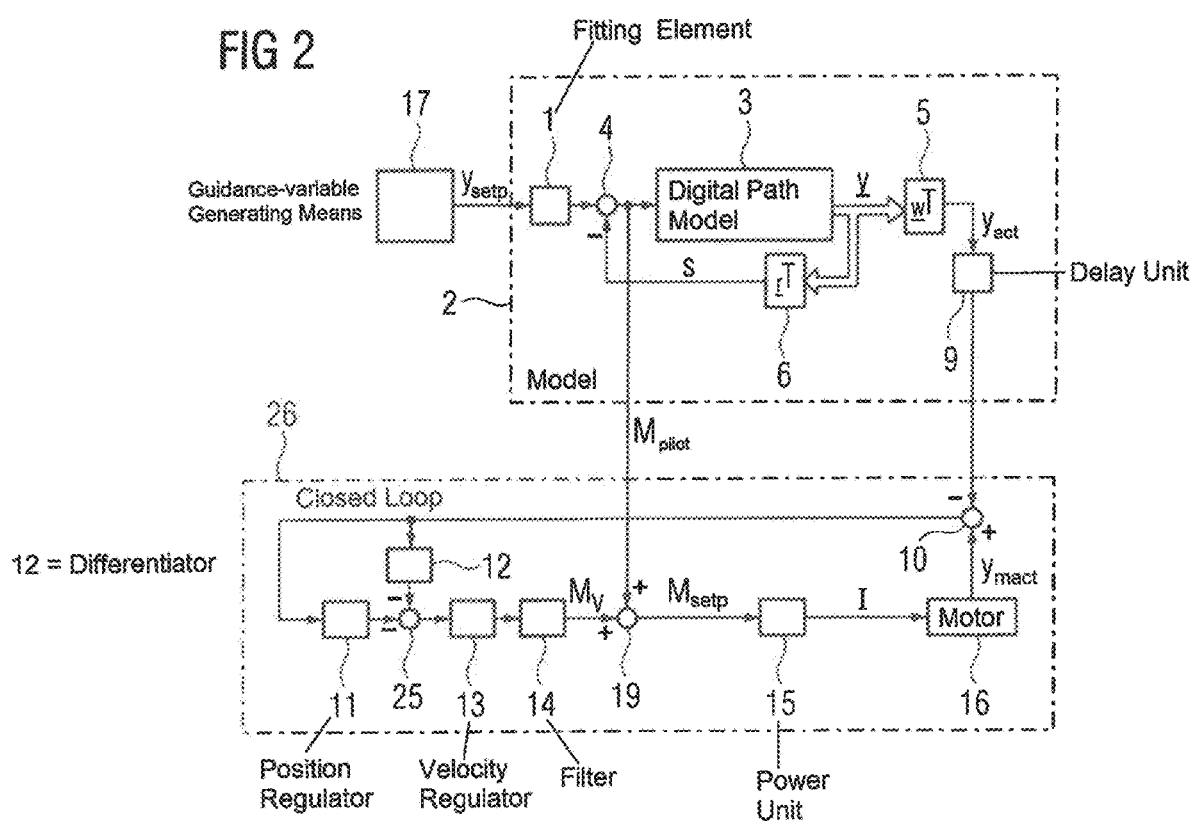
FIG. 2 is a schematic representation of a device according to the invention for guiding the movement of a movable machine element of a machine.

FIG. 2 is a schematic representation of a device according to the invention for guiding the movement of a movable machine element of a machine. Herein, the device can, for example, be present in the form of a numerical machine control device and/or a regulating device of the machine. The device has guidance-variable generating means 17, which generates a setpoint guidance variable $y_{setp}$, as seen in FIG. 4b, step 401, describing the desired movement process of the machine element 18, for example a setpoint guide position, a setpoint guide velocity or a setpoint guide acceleration and sends it to a model 2 as an input variable seen in FIG. 4b, step 402. The guidance-variable generating means 17 can, for example, be present as a commercially available component of the numerical control in machines, such as, for example, machine tools, production machines and/or robots. Herein, the setpoint guidance variable $y_{setp}$ is a variable that is normally supplied directly as a setpoint variable to a downstream closed loop 26 which regulates the movement process of the machine element 18 in accordance with the prespecified setpoint guidance variable $y_{setp}$.

According to the invention, a model 2 for determining an actual guidance variable $y_{act}$ and/or an actual pilot variable $M_{pilot}$ is now interposed between the setpoint guidance-variable generating means 17 and the closed loop 26. The actual pilot variable $M_{pilot}$ is, for example, present as a pilot torque and the actual guidance variable $y_{act}$ can, for example, be an actual position model variable. Herein, the model 2 has the above-described digital path model 3 and a state regulator, which is implemented in the form of a feedback vector 6 and a fitting element 1. The model 2 furthermore has a fitting vector w (see reference symbol 5).

The model 2 can, for example, be a linearly regulated path model in which an output variable of the digital path model 3 modified by means of a feedback vector 6 is fed back to an input variable of the path model 3, s as seen in FIG. 4b, step 403. The output variable of the digital path model 3 is the state vector $\underline{y}$. The digital path model 3 is used to simulate the mechanical behavior of the motor 16, the machine element 18 and the mechanical connection between the motor 16 and the machine element 18. The dynamic behavior of this system is parameterized via the total moment of inertia and the poles and zeros of the transfer function $H_{Mot}=u_{Mot}/f_{Mot}$.

The state regulator enables undesired properties of the elements involved in the movement to be corrected in advance. Herein, the actual pilot variable $M_{pilot}$ and the actual guidance variable $y_{act}$ are determined, as seen in FIG. 4b steps 404 and 405. The feedback vector r can have individual feedback coefficients r1, r2, r3 and r4 (see reference symbol 6) and leads back to a scalar variable $s=\underline{y}rT$ by multiplication with the state vector $\underline{y}$.

The fitting vector w required to generate the scalar actual guidance variable $y_{act}$ which, multiplied by the state vector $\underline{y}$, produces the scalar actual guidance variable $y_{act}$ can have w1=1 and w2 ... N=0 as fitting coefficients, so that $y_{act}=\underline{y}wT$.

Herein, the feedback vector r can, for example, be selected such that one single or more natural oscillation frequencies of the digital path model 3 are damped. The fitting element 1, for example a prefilter, can be used to influence the overall gain of the model 2. Thus, in the simplest case, the fitting element 1 can include a multiplication of the setpoint guidance variable $y_{setp}$ with a constant factor (for example 1.5). A subtractor 4 is used to subtract the output variable y modified by means of the feedback variable r, i.e., the state vector, of the digital path model 3 from the setpoint guidance variable $y_{setp}$ modified by the fitting element 1 with a subtractor 4. This results in the actual pilot variable $M_{pilot}$, which is supplied to the digital path model 3 as an input variable. This outputs the state vector $\underline{y}$ as an output variable, wherein the scalar actual guidance variable $y_{act}$ is then generated by means of the fitting vector w.

A delay unit connected downstream of the digital path model 3 enables the behavior of a power unit (for example a converter) that actuates the motor 16 and possibly further delays not taken into account in the model to be introduced independently of the design of the digital path model 3. In the example in FIG. 2, the downstream delay unit 9 is used to delay the actual guidance variable $y_{act}$ as seen in FIG. 4b, step 406 according to the delay of the power unit 15, i.e., the time required by the power unit 15 to build up the current I, and to output it at the output of the delay unit 9. However, the delay does not necessarily have to be performed.

The actual pilot variable $M_{pilot}$ and the possibly delayed actual guidance variable $y_{act}$ are fed into the closed loop 26 for regulating the motor 16 as seen in FIG. 4b, steps 407 and 408. A subtractor 10 is used to subtract the delayed actual guidance variable $y_{act}$ from an actual variable $y_{mact}$ measured, for example, by a sensor. The measured actual variable $y_{mact}$ can, for example be the rotor position angle of the motor 16. The calculated difference is then supplied from the subtractor 10 to a differentiator 12, which ascertains the time derivative and forwards it to a position regulator 11. The output variables of the differentiator 12 and the position regulator 11 are inverted in each case and added with the aid of an adder 25. The output variable of the adder 25 is supplied to a velocity regulator 13 as an input variable.

The output variable of the velocity regulator 13 is then filtered with the aid of an optional filter 14 in order to filter out any undesirable properties that may still occur in the frequency response. The filter 14 outputs the actual regulator torque $M_v$, which is added to the actual pilot variable $M_{pilot}$, i.e., the pilot torque, by an adder 19, in order to obtain the setpoint torque $M_{setp}$. The setpoint torque $M_{setp}$ is then supplied to the power unit 15 as an input variable, which can, for example, be present in the form of a converter with associated actuation electronics. The power unit 15 is actuated according to the setpoint $M_{setp}$ in order to set the level of the motor current I. As a result, the motor 16 actuates the movement process of the machine element 18 in a dynamically corrected manner.

The system shown in FIG. 2 with the model 2 and the closed loop 26 can, for example, be implemented for a plurality of machine shafts of a machine, wherein the specific dynamic behavior of the different shafts can be depicted in the different parameters of the digital path models 3. Herein, the setpoint guidance-variable generating means 17 can generate an associated setpoint guidance variable $y_{setp}$ for each machine shaft and specify it as an input variable for the respective associated model 2.

Figure 3:
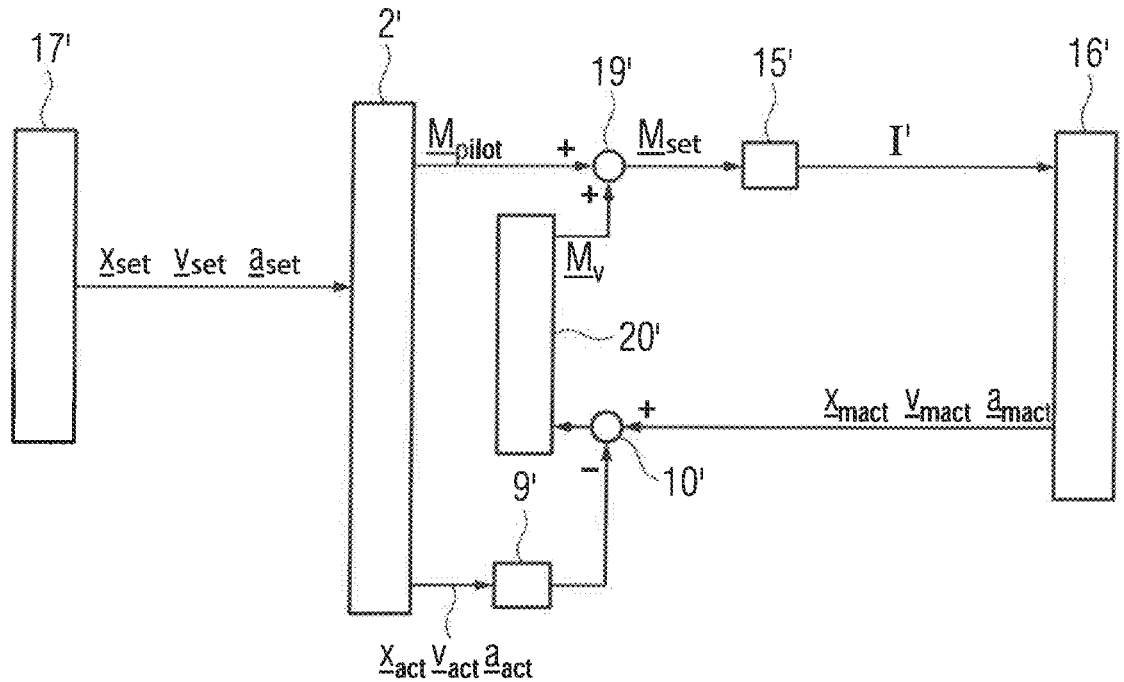
FIG. 3 is an information flow diagram to illustrate a general concept of the invention.

FIG. 3 is a schematic information flow diagram for the general case in which the individual machine shafts can be coupled to one another. For example, a change in position of a machine shaft can automatically cause a change in position of other machine shafts, such as in a robot arm with a plurality of joints. A setpoint generating means 17' specifies single or more setpoint guidance variables such as, for example, a setpoint position $x_{setp}$, a setpoint velocity $v_{setp}$ and/or a setpoint acceleration $a_{setp}$, to a model 2' as input variables. Herein, the individual variables can be present as vectors corresponding to the number of machine shafts to be moved. Herein, the model 2' ascertains for the individual machine shafts of the machine single or more actual guidance variables such as, for example, an actual torque variable $M_{act}$, an actual velocity variable $v_{act}$ and/or an actual acceleration variable $a_{act}$. These variables can also be present as vectors. They are delayed with the aid of a delay unit 9' according to the time delay of the power unit 15.

At the motor 16' and/or from another location, measured variables such as, for example, a measured actual position variable $x_{mact}$, a measured actual velocity variable $v_{mact}$ and/or measured actual acceleration variable $a_{mact}$, wherein the variables can also be present as vectors, are deducted from the delayed guidance variables calculated by the model 2' by means of a subtractor 10' and the difference supplied to a regulator 20'. These ascertain the regulator torque $M_V$ as the output variable, wherein then the pilot variable $M_{pilot}$ from the regulating torque $M_V$ is added by means of an adder 19 and in this way a setpoint torque $M_{setp}$ is determined and supplied to a power unit 15 as an input variable (herein, $M_{pilot}$, $M_V$ and $M_{setp}$ can also be present as vectors). Herein, the power unit 15' supplies the currents I' for the individual motors 16' for moving the machine shaft of the machine. Hence, the general inventive approach can also be implemented with machines in which coupled machine shafts are present with the aid of a model 2' that also takes account of the couplings of the machine shafts.

Figure 4A:
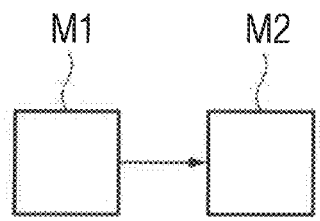
FIGS. 4a and b are flow diagrams of steps of a method according to the invention for guiding the movement of a movable machine element of a machine.
Figure 4B:
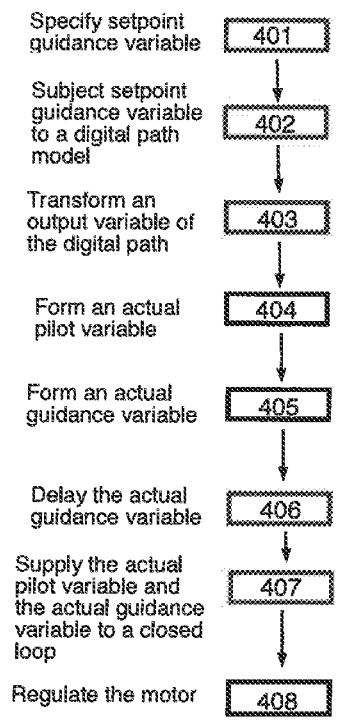

As can be seen in Figure FIG. 4a, M1 represents specifying, for actuating the motor, a setpoint guidance variable describing a desired movement process of the machine element. M2 represents determining an actual pilot variable or an actual guidance variable from the setpoint guidance variable by subjecting the setpoint guidance variable to a digital path model which is parameterized by a total moment of inertia and poles and zeros of a transfer function of a mechanical system composed of the motor, the shaft and the machine element and which simulates a dynamic behavior of the machine element and the motor.

The invention enables the principle of model-based control to improve the dynamic behavior of the movement of machine elements, to be operated more easily, to be adapted without expert knowledge and to become more effective due to the better model quality.

In the preceding detailed description, various features for improving the stringency of the presentation have been summarized in one or more examples. However, herein, it should be clear that the above description is merely illustrative and in no way restrictive in nature. It serves to cover all alternatives, modifications and equivalents of the various features and exemplary embodiments. In the light of the above description, many other examples will be immediately and directly apparent to those skilled in the art on the basis of their specialist knowledge.

The exemplary embodiments were selected and described in order to be able to present the principles underlying the invention and its possible applications in practice in the best possible way. As a result, those skilled in the art will be able to optimally modify and utilize the invention and its different exemplary embodiments in respect of the intended use. In the claims and the description, the terms "including" and "having" are used as neutral language terms for the corresponding term "comprising". Furthermore, the use of the terms "a" and "an" is not in principle intended to exclude a plurality of features and components described in this way.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for guiding a movement of a machine element of a machine driven via a shaft with the aid of a motor, comprising:
specifying, for actuating the motor, a setpoint guidance variable describing a desired movement process of the machine element;
subjecting the setpoint guidance variable to a digital path model which is parameterized by a total moment of inertia and poles and zeros of a transfer function of a mechanical system composed of the motor, the shaft and the machine element and which simulates a dynamic behavior of the machine element and the motor;
transforming an output variable of the digital path model via a feedback variable, and
forming an actual pilot variable by subtracting the transformed output variable from the setpoint guidance variable at an input summator of the digital model;
forming an actual guidance variable by multiplying the output variable of the digital path model by a fitting vector;
supplying the actual pilot variable and the actual guidance variable to a closed loop to set a level of current for the motor; and
regulating the motor to actuate the movement of the machine element.

2. The method of claim 1, wherein the method is performed in real time during the movement of the machine element.

3. The method of claim 1, wherein the digital path model is a regulating path of a linearly regulated digital model.

4. The method of claim 1, wherein the setpoint guidance variable comprises a setpoint position, a setpoint velocity, or a setpoint acceleration of the machine element.

5. The method of claim 1, further comprising delaying the actual guidance variable according to a time delay of a power unit in the closed loop by a delay unit before supplying the actual guidance variable to the closed loop.

6. The method of claim 1, further comprising, for regulating the motor, supplying a difference between the actual guidance variable and a measured actual variable to a position regulator of the closed loop.

7. The method of claim 1, further comprising, for controlling the level of the motor current, adding an output signal of a velocity regulator of the closed loop to the actual pilot variable.

8. A machine, comprising:
a motor;
a shaft coupled to the motor;
a movable machine element coupled to the shaft, with movement of the machine element controlled by the motor; and
a numerical machine control device configured to:
output a setpoint guidance variable describing a desired movement process of the machine element for actuating of the motor;
subject the setpoint guidance variable to a digital path model, which is parameterized by a total moment of inertia and poles and zeros of a transfer function of the mechanical system composed of the motor, the shaft and the machine element and which simulates a dynamic behavior of the machine element and the motor;
transform an output variable of the digital path model via a feedback variable, and
form an actual pilot variable by subtracting the transformed output variable from the setpoint guidance variable at an input summator of the digital model;
form an actual guidance variable by multiplying the output variable of the digital path model by a fitting vector;
supply the actual pilot variable and the actual guidance variable to a closed loop to set a level of current for the motor; and
regulate the motor to actuate the movement of the machine element.

9. A computer program product for numerical control of a machine, the computer program product embodied on a non-transitory computer-readable medium product and having computer-executable instructions, which, when loaded into a memory of a numerical machine control device and executed by a processor of the numerical machine control device, implement a method for guiding the movement of a machine element of the machine as set forth in claim 1.

* * * * *